(12) United States Patent
Vauchel

(10) Patent No.: US 8,662,839 B2
(45) Date of Patent: Mar. 4, 2014

(54) AIRCRAFT ENGINE NACELLE AIR INTAKE ASSEMBLY

(75) Inventor: Guy Bernard Vauchel, Harfleur (FR)

(73) Assignee: Aircelle, Gonfreville l'Orcher (FR)

( * ) Notice: Subject to any disclaimer, the term of this patent is extended or adjusted under 35 U.S.C. 154(b) by 652 days.

(21) Appl. No.: 13/000,683

(22) PCT Filed: Apr. 27, 2009

(86) PCT No.: PCT/FR2009/050771
§ 371 (c)(1),
(2), (4) Date: Dec. 22, 2010

(87) PCT Pub. No.: WO2010/007258
PCT Pub. Date: Jan. 21, 2010

(65) Prior Publication Data
US 2011/0103935 A1    May 5, 2011

(30) Foreign Application Priority Data

Jun. 25, 2008 (FR) ...................... 08 03558

(51) Int. Cl.
*F01D 25/24* (2006.01)
(52) U.S. Cl.
USPC ...................................... 415/214.1

(58) Field of Classification Search
USPC ................ 415/214.1; 244/53 B, 53 R, 110 B; 60/226.2
See application file for complete search history.

(56) References Cited

U.S. PATENT DOCUMENTS

2003/0163985 A1    9/2003    Stretton

FOREIGN PATENT DOCUMENTS

FR    2901244 A1    11/2007

OTHER PUBLICATIONS

International Search Report PCT/FR2009/050771; Dated Nov. 24, 2009.

*Primary Examiner* — Edward Look
*Assistant Examiner* — Maxime Adjagbe
(74) *Attorney, Agent, or Firm* — Brinks Gilson & Lione

(57) ABSTRACT

This aircraft engine nacelle air intake assembly comprises an air intake structure comprising an air intake lip (7) and an acoustic shroud (5) extending downstream of this air intake lip (7) and designed to be mounted on a fixed structure (2), the said air intake structure being designed to be able to move with respect to the said fixed structure (2) between an operating position in which the said lip (7) is in contact with the said shroud (5), and a maintenance position in which the said lip (7) is set apart in the upstream direction away from the said shroud (5). This assembly is notable in that it comprises runway means (19) designed to centre this lip (7) with respect to this shroud (5).

15 Claims, 5 Drawing Sheets

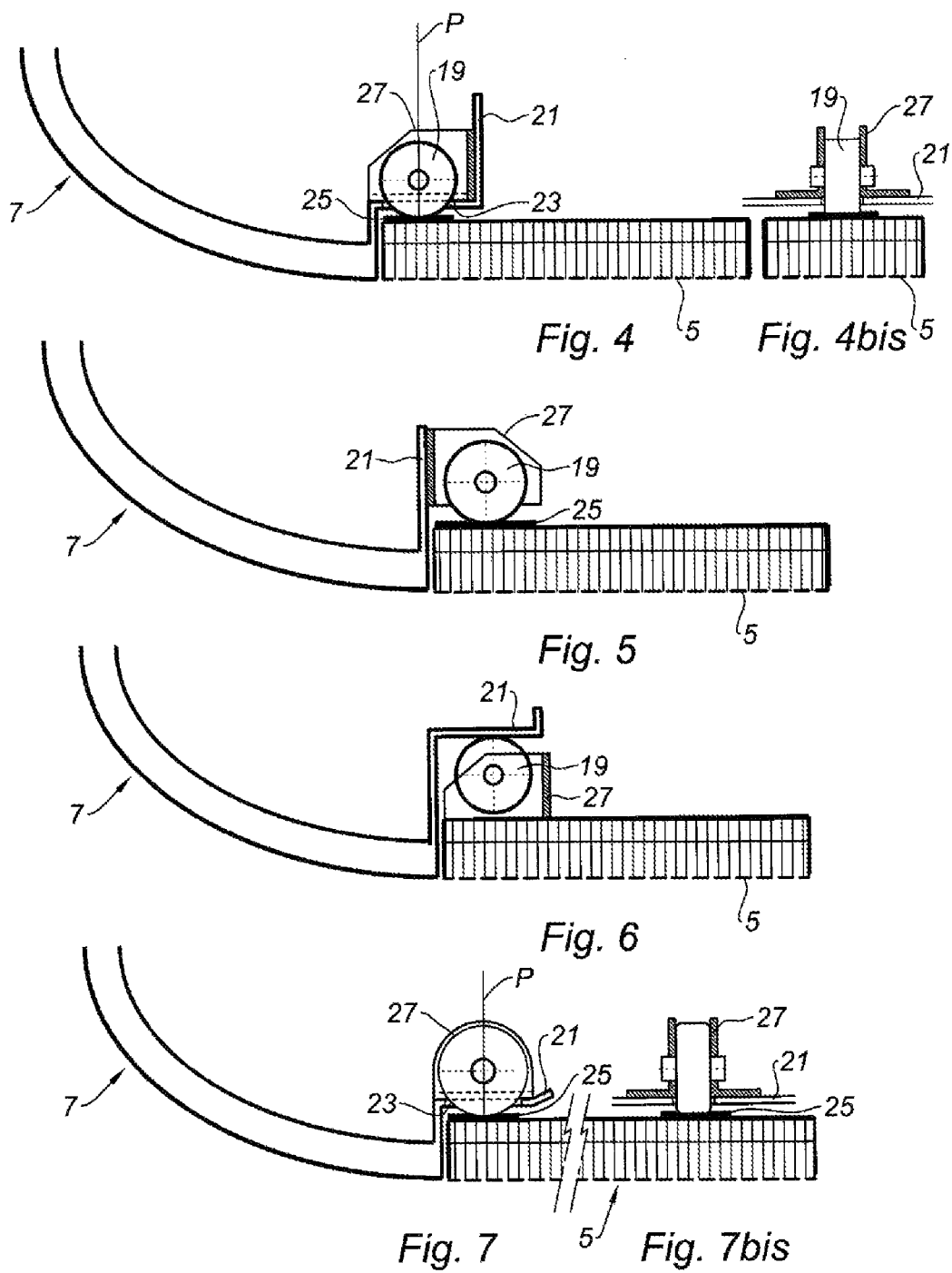

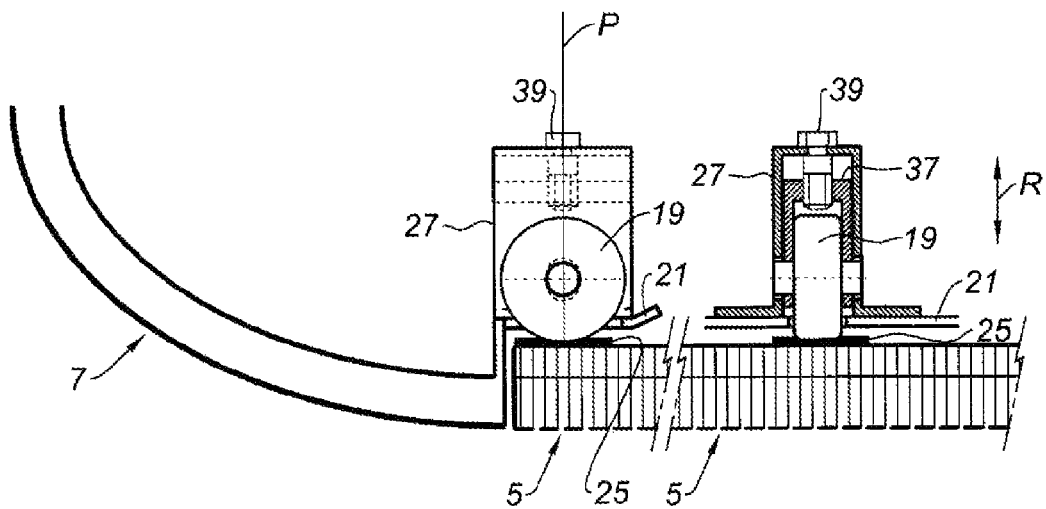
Fig. 11        Fig. 11bis
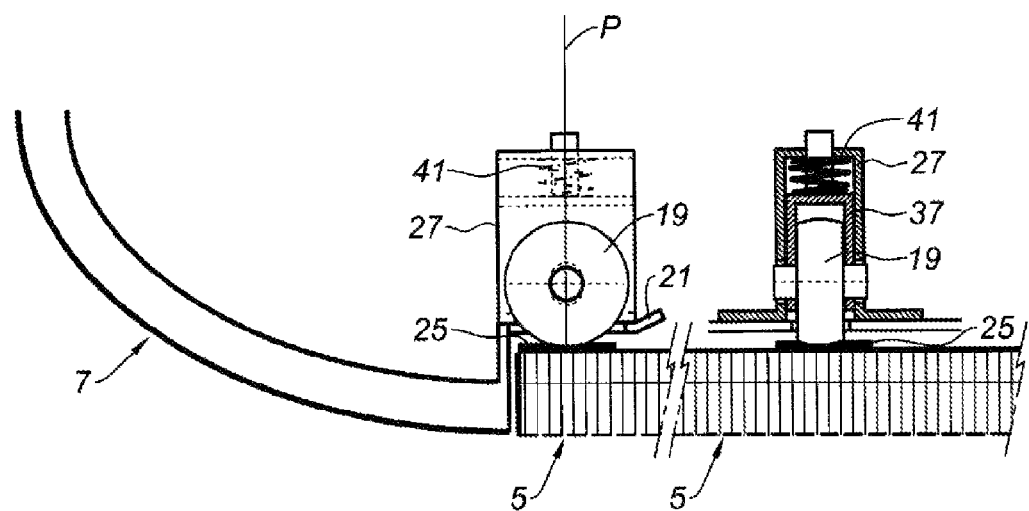
Fig. 12        Fig. 12bis

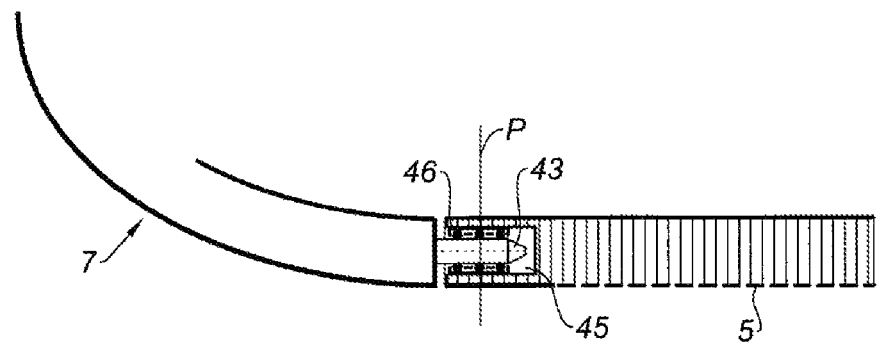
*Fig. 13*
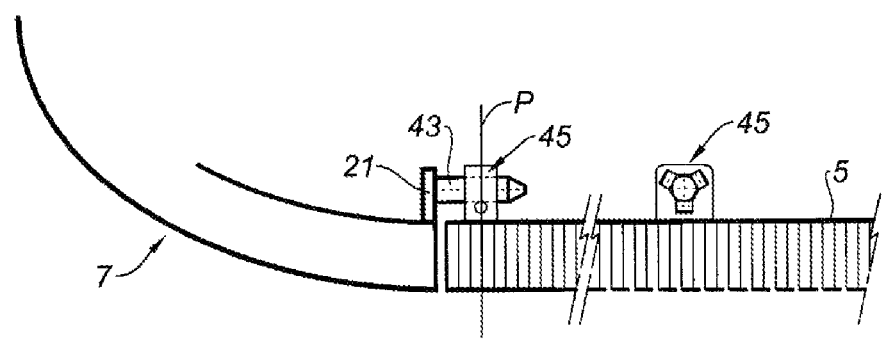
*Fig. 14*   *Fig. 14bis*
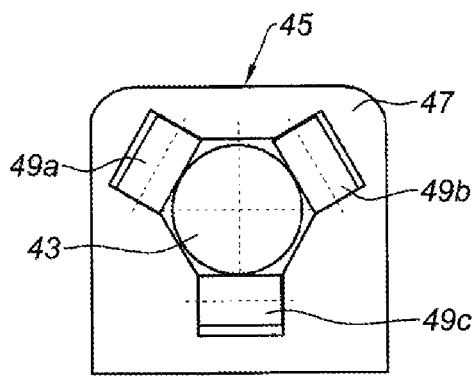
*Fig. 15*
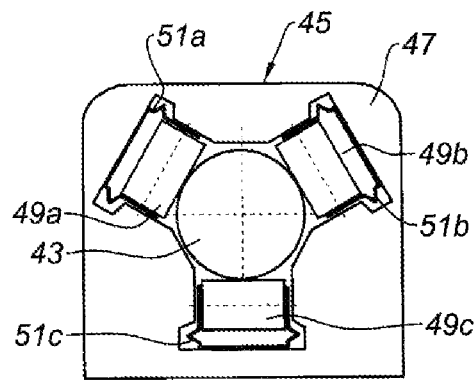
*Fig. 16*

AIRCRAFT ENGINE NACELLE AIR INTAKE ASSEMBLY

TECHNICAL FIELD

The present patent application relates in particular to an aircraft engine nacelle air intake assembly.

BRIEF DISCUSSION OF RELATED ART

A nacelle equipped with such an air intake assembly is shown generically in the appended FIG. 0.

As can be seen in this figure, such an air intake assembly 1 is placed upstream of the nacelle and makes it possible to channel the air from the outside towards the fan 2 of the aircraft engine.

As is known from the prior art and as can be seen in the appended FIGS. 1 to 3, the air intake assembly 1 may comprise an air intake structure 3 and, downstream thereof, an acoustic shroud 5.

The air intake structure 3 comprises an air intake lip 7, a peripheral element constituting the leading edge of this air intake structure, and an external panel 9 extending the outer part of the air intake lip 7.

The acoustic shroud 5 consists essentially of a panel with a sound absorption capability (honeycomb structure for example), of substantially cylindrical shape, which is mounted in a fixed position on the fan casing (not shown) of the aircraft engine.

The air intake structure may be mounted so as to be able to slide in the direction D of the axis of the engine, between an operating position shown in FIGS. 1 to 3, in which the acoustic shroud is located in the continuation of the inner edge of the lip, and a maintenance position, in which this structure is moved upstream away from the acoustic shroud.

In the operating position shown in FIGS. 1 to 3, it is essential that the lower edge of the lip is aligned as perfectly as possible with the acoustic shroud, so as to ensure an aerodynamic continuity and a perfect sealing of the lip with respect to the shroud and also to allow a proper absorption of the forces transmitted to the acoustic shroud by the air intake structure.

As can be seen in FIGS. 1 to 3, different interfaces between the lip 7 and the shroud 5 are used in the prior art to obtain the desired sealing effect: seal 13 between the lip 7 and the upstream edge of the shroud 5 (FIG. 1), connecting pin 15 between a return of the lip 7 and the shroud 5 (FIG. 2), or seal 17 between a chamfered edge of the lip 7 and a monolithic part of the shroud 5 (FIG. 3).

It is therefore necessary to provide a minimal clearance between this lip and this shroud, the drawback of such a clearance being that it risks leading to a jamming of the air intake structure when it is opened for maintenance operations, and to a difficulty in fitting this air intake structure onto the acoustic shroud when closing it.

The aim of the present invention is in particular to overcome this drawback.

BRIEF SUMMARY

This aim of the invention is achieved with an aircraft engine nacelle air intake assembly comprising an air intake structure including an air intake lip and an acoustic shroud extending downstream of this air intake lip and designed to be mounted on said fixed structure, said air intake structure being designed to be able to move with respect to said fixed structure between an operating position, in which said lip is in contact with said shroud, and a maintenance position, in which said lip is moved upstream away from said shroud, this assembly being notable in that it comprises rolling means making it possible to centre this lip with respect to said shroud.

The presence of these rolling means makes it possible, while having a minimal clearance between the lip and the shroud, to avoid any risk of jamming during the opening of the air intake and any risk of obstruction during the closing of the air intake.

According to other optional features of the air intake assembly according to the invention:
- said rolling means comprise rollers attached to said air intake structure,
- said rollers are mounted on said air intake lip,
- said rollers are mounted inside an extension of said lip, this extension being provided with openings for the passage of an active part of said rollers,
- said extension has a chamfered end,
- said rollers are mounted on an inner partition of said lip,
- bearing plates for said rollers are attached to said shroud,
- said bearing plates are attached to a monolithic part of said shroud,
- said rolling means comprise rollers able to be mounted on said fixed structure,
- said rolling means comprise rollers mounted on said shroud,
- said lip has a bearing extension for said rollers,
- said rolling means comprise rolling tunnels attached to said shroud and pins attached to said lip, said pins being arranged so as to penetrate into said tunnels,
- adjustment means for adjusting the position of said rolling means are provided,
- elastic return means for returning said rolling means to their bearing position are provided.

The present invention also relates to an aircraft engine nacelle equipped with an air intake assembly according to the above.

BRIEF DESCRIPTION OF THE DRAWINGS

Other features and advantages of the present invention will become apparent in the light of the following description and upon examining the appended figures, in which:

FIGS. 4 to 14 are schematic views in longitudinal section of air intake assemblies of the present invention, according to different embodiments;

FIGS. 4bis, 7bis, 11bis, 12bis, 14bis are views in cross section, taken along the respective planes P of FIGS. 4, 7, 11, 12 and 14, of the variants shown in these figures;

FIGS. 15 and 16 are views in cross section, taken along the respective planes P of FIGS. 13 and 14, of two variant embodiments of a rolling tunnel.

DETAILED DESCRIPTION

Figure 0:
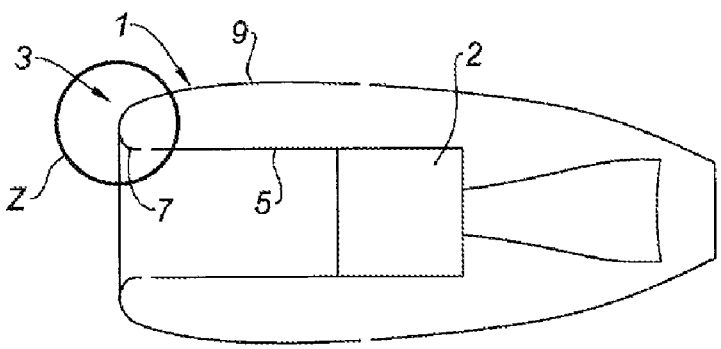
FIG. 0 is a schematic view in cross section of a generic nacelle of the prior art, mentioned in the preamble of the present patent application.
Figure 1:
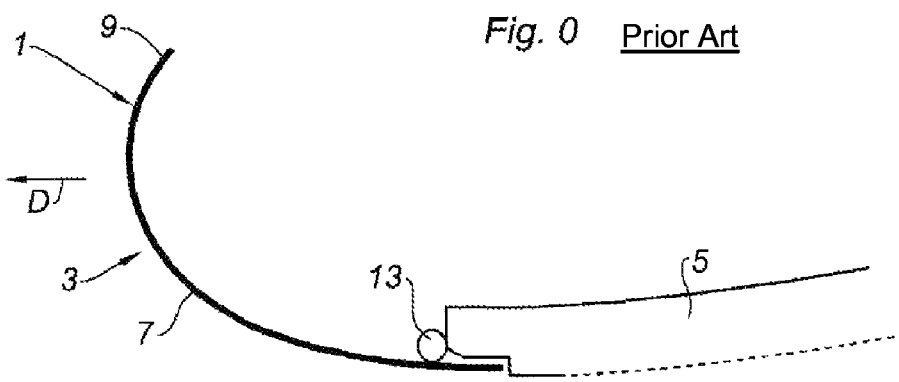
FIGS. 1 to 3 are schematic views in longitudinal section of the zone Z of the nacelle of FIG. 0, showing several types of air intake assemblies of the prior art which are mentioned in the preamble of the present patent application.
Figure 2:
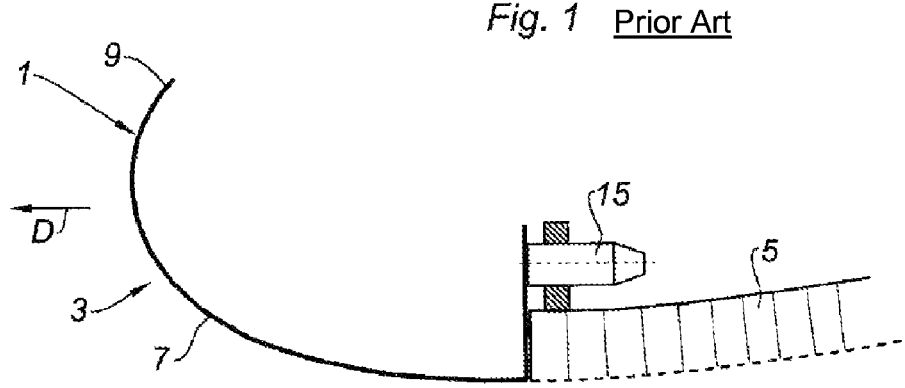
Figure 3:
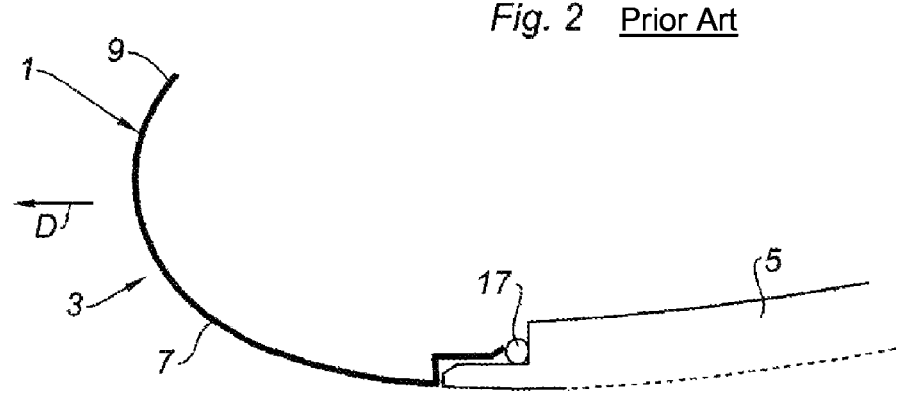

In all of these figures, identical references denote identical or analogous elements or sets of elements.

It should also be noted that the terms "upstream" and "downstream" will be used, it being necessary for these two terms to be understood in relation to the direction of the air flow relative to the air intake assembly, namely in the present case from left to right in all of the appended figures.

With reference to FIGS. 4 and 4*bis*, it is possible to see a roller 19 mounted in a pivoting manner inside an extension 21 of the lip 7, via a bracket 27.

The opening 23 formed inside the extension 21 allows this roller 19 to cooperate with a bearing plate 25 for this roller 19 on the acoustic shroud 5.

The extension 21 is preferably formed around all or almost all of the circumference of the lip 7.

A number of rollers analogous to the roller 19 are distributed around this circumference.

In the embodiment shown in FIG. 5, the extension 21 takes the form of a simple return relative to the lip 7, support brackets 27 for the rollers 19 being fixed to said return.

In the embodiment of FIG. 6, the brackets 27 supporting the rollers 19 are fixed to the acoustic shroud 5 and cooperate with an L-shaped extension 21 of the lip 7.

In the embodiment of FIGS. 7 and 7*bis*, the brackets 27 and their associated rollers 19 are mounted on an extension 21 of the lip 7 having a chamfered downstream edge, which makes it easier to fit the lip 7 onto the acoustic shroud 5 as this lip is moved from its maintenance position to its normal operating position.

It will be noted that, as in the variant of FIGS. 4 and 4*bis*, the extension 21 has openings 23 allowing the passage of the rollers 19 for the purpose of enabling them to cooperate with the bearing plate 25.

Figure 8:
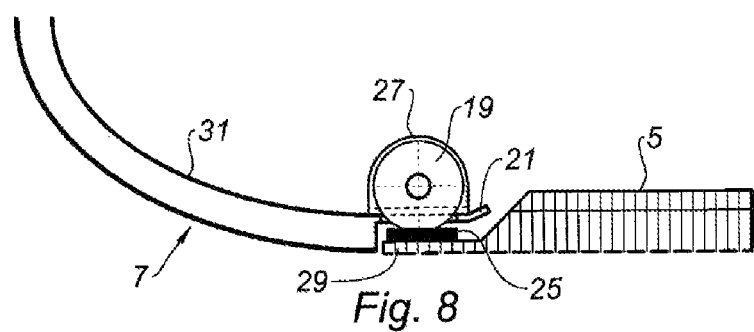

In the variant shown in FIG. 8, the upstream edge 29 of the acoustic shroud 5 has a flattened, so-called "monolithic" structure which is extremely compact and resistant.

In this case, the plates 25 may be fixed to this edge 29, the extension 21 then being arranged in the continuation of the inner face 31 of the lip 7.

Figure 9:
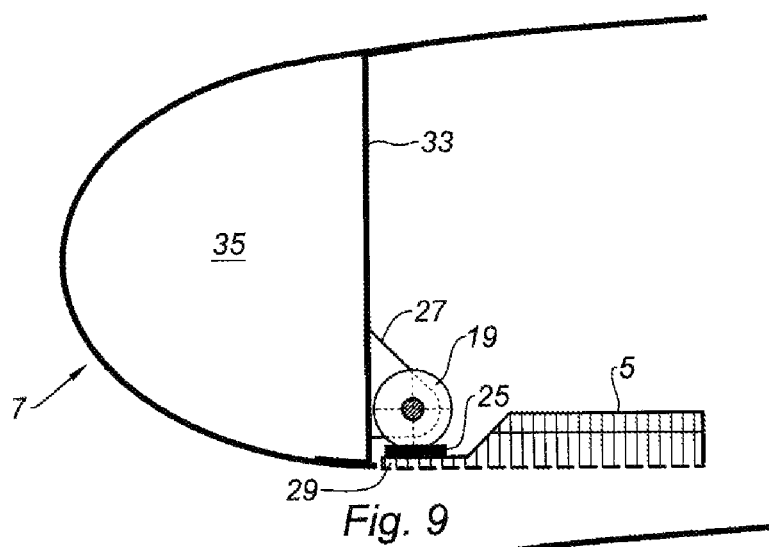

In the variant shown in FIG. 9, each set including a bracket 27 and a roller 19 is fixed to an inner partition 33 of the air intake lip, it being possible for this inner partition to be for example the partition defining a de-icing compartment 35 for this air intake lip.

In the variant of FIG. 9, the bearing of the rollers 19 against the acoustic shroud 5 takes place via plates 25 arranged on a monolithic upstream edge 29 of this shroud, in a manner analogous to the situation in FIG. 8.

Figure 10:
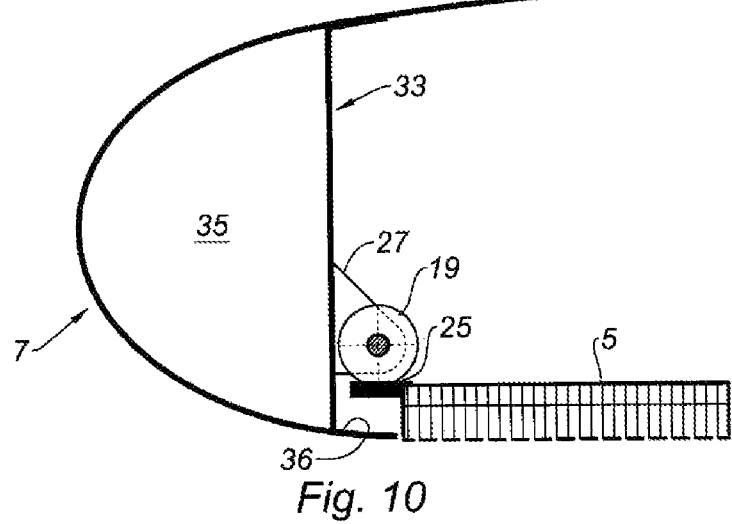

In the variant of FIG. 10, the bearing plates 25 are arranged with an overhang and upstream of the acoustic shroud 5, and a return 36 of the partition 33 ensures the continuity of the air intake lip 7 with the acoustic shroud 5.

FIGS. 11 and 11*bis* show a variant analogous to that of FIGS. 7 and 7*bis*, apart from the fact that the rollers 19 are each mounted on a movable bracket 37 which is mounted in an adjustable manner inside a fixed bracket 27.

Adjustment means such as screws 39, interposed between the fixed bracket 27 and the movable bracket 37, make it possible to adjust the radial position (that is to say in the direction R shown in FIGS. 11 and 11*bis*) of the rollers 19.

In the variant shown in FIGS. 12 and 12*bis*, elastic return means 41 such as springs replace the adjustment means 39. These elastic return means, interposed between the fixed bracket 27 and the movable bracket 37, make it possible to bring the rollers 19 back into contact with the plates 25.

In the variant shown in FIG. 13, the downstream edge of the air intake lip 7 is provided with a plurality of pins 43, these pins 43 cooperating with respective tunnels 45 formed in the upstream edge of the acoustic shroud 5.

Each tunnel 45 is equipped with rolling means such as the balls 46 able to cooperate with the pins 43.

The penetration of the pins 43 into the respective tunnels 45 is facilitated by the chamfered shape of the ends of these pins.

In the embodiment of FIGS. 14 and 14*bis*, the pins 43 are fixed to a radial extension 21 of the lip 7 and cooperate with rolling tunnels 45 attached to the radially outer face of the acoustic shroud 5.

As can be seen in FIG. 15, these attached rolling tunnels 45 may typically comprise a body 47, inside which there are mounted, in this example, essentially 120° apart, three cylindrical rollers 49*a*, 49*b*, 49*c* cooperating with the respective pins 43.

The number of rollers is not limited; it is determined by the person skilled in the art as a function of the force transmission angles seen by the structure in the considered installation of centring systems.

In the variant shown in FIG. 16, it is possible to see that the rollers 49*a*, 49*b*, 49*c* may be mounted inside the body 47 via elastic support means 51*a*, 51*b*, 51*c*, allowing a certain flexibility in the direction perpendicular to the axes of rotation of these rollers.

As a variant (not shown), it would also be possible to provide that the rollers 49*a*, 49*b*, 49*c* are mounted on their respective axles via elastomeric elements, making it possible to obtain a result substantially analogous to that of the elastic means 51*a*, 51*b*, 51*c*.

The mode of operation and the advantages of the present invention are directly apparent from the above description.

For maintenance operations, it may be necessary to slide the air intake lip 7 upstream away from the acoustic shroud 5 to gain access to elements located for example inside the air intake lip 7, or outside the acoustic shroud 5.

During this sliding, the rollers 19, the balls 46 or the rollers 49 make it possible to limit the friction of the air intake lip with respect to the acoustic shroud, and thus to facilitate this sliding movement and to eliminate any risk of jamming.

When it is desired to return the air intake lip to its normal operating position, that is to say by sliding it downstream towards the acoustic shroud 5, the rollers 19, the balls 46 or the rollers 49 make it possible for this air intake lip to dock onto this acoustic shroud 5 without obstruction, in spite of the clearances between these sets of elements which are calculated to be as small as possible so as to meet the constraints in terms of sealing, optimised air flow and force transmission.

The presence of the plates 25 makes it possible to distribute over the acoustic shroud 5 the forces transmitted by the rollers 19.

The presence of the adjustment means 39 makes it possible to adjust radially the positions of the rollers 19 during the initial mounting of the air intake lip 7 on the acoustic shroud 5, and/or subsequently, in particular in the event of slight deformation of the air intake lip 7 and/or of the acoustic shroud 5.

The presence of the elastic return means 41 (or 51*a*, 51*b*, 51*c*) makes it possible to obtain a certain damping of the forces transmitted between the air intake lip 7 and the acoustic shroud 5, particularly in the event of failure of the engine associated with this air intake.

Of course, the present invention is in no way limited to the embodiments described and shown, which are given solely by way of examples.

The rollers could be interposed between the external panel of the air intake structure and a fixed structure supporting the acoustic shroud (shroud attachment flange, or fan casing).

The precepts of the invention, described in the context of moving an air intake lip with respect to an acoustic shroud, could also be applied to other movable parts of an aircraft engine nacelle.

All the described concepts may be used alone or in combination with one another, in particular with conventional centring systems such as pins in a corresponding bore.

The invention claimed is:

1. Aircraft engine nacelle air intake assembly comprising an air intake structure including an air intake lip and an acoustic shroud extending downstream of this air intake lip and designed to be mounted on a fixed structure, said air intake structure being designed to be able to move with respect to said fixed structure between an operating position, in which said lip is in contact with said shroud, and a maintenance position, in which said lip is moved upstream away from said shroud, this assembly further comprising rolling means for making it possible to center this lip with respect to said shroud.

2. Assembly according to claim 1, wherein said rolling means comprise rollers attached to said air intake structure.

3. Assembly according to claim 2, wherein said rollers are mounted on said air intake lip.

4. Assembly according to claim 3, wherein said rollers are mounted inside an extension of said lip, this extension being provided with openings for the passage of an active part of said rollers.

5. Assembly according to claim 4, wherein said extension has a chamfered end.

6. Assembly according to claim 2, wherein said rollers are mounted on an inner partition of said lip.

7. Assembly according to claim 2, wherein bearing plates for said rollers are attached to said shroud.

8. Assembly according to claim 7, wherein said bearing plates are attached to a monolithic part of said shroud.

9. Assembly according to claim 1, wherein said rolling means comprise rollers able to be mounted on said fixed structure.

10. Assembly according to claim 1, wherein said rolling means comprise rollers mounted on said shroud.

11. Assembly according to claim 10, wherein said lip has a bearing extension for said rollers.

12. Assembly according to claim 1, wherein said rolling means comprise rolling tunnels attached to said shroud and pins attached to said lip, said pins being arranged so as to penetrate into said tunnels.

13. Assembly according to claim 1, further comprising adjustment means for adjusting the position of said rolling means.

14. Assembly according to claim 1, further comprising elastic return means for returning said rolling means to their bearing position.

15. Aircraft engine nacelle, comprising an air intake assembly according to claim 1.

* * * * *